(12) United States Patent
Farkas

(10) Patent No.: US 8,606,961 B2
(45) Date of Patent: Dec. 10, 2013

(54) METHOD AND APPARATUS FOR LINK-STATE HANDSHAKE FOR LOOP PREVENTION

(75) Inventor: János Farkas, Kecskemét (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 364 days.

(21) Appl. No.: 12/922,235

(22) PCT Filed: Mar. 10, 2009

(86) PCT No.: PCT/IB2009/000477
§ 371 (c)(1),
(2), (4) Date: Sep. 13, 2010

(87) PCT Pub. No.: WO2009/112929
PCT Pub. Date: Sep. 17, 2009

(65) Prior Publication Data
US 2011/0022725 A1     Jan. 27, 2011

Related U.S. Application Data

(60) Provisional application No. 61/035,850, filed on Mar. 12, 2008.

(51) Int. Cl.
*G06F 15/173*     (2006.01)
*H04L 12/28*      (2006.01)
(52) U.S. Cl.
USPC ........................................... 709/238; 370/254
(58) Field of Classification Search
USPC ......................................... 709/238; 370/254
See application file for complete search history.

(56) References Cited

U.S. PATENT DOCUMENTS

2001/0017843 A1   8/2001   Yagyu et al.
2005/0105475 A1*  5/2005   Norrgard et al. .............. 370/254

(Continued)

OTHER PUBLICATIONS

Antonova, "Spanning Tree Protocol Interoperability with Other Loop Prevention Algorithms", Apr. 22-26, 2007, Electrical and Computer Engineering, 2007. CCECE 2007. Canadian Conference on, p. 1098-1101.*

(Continued)

*Primary Examiner* — Jeffrey R Swearingen
*Assistant Examiner* — Taylor Elfervig

(57) ABSTRACT

A network node of a telecommunications network controlled by a link-state protocol includes a network interface which receives a message that contains information on a change in topology of the network. The node includes a processing unit that blocks forwarding of traffic to at least one neighbor node of the network at the network interface, agrees on the change in topology with the neighbor node; and unblocks the forwarding of traffic when the neighbor node has information about the topology which is the same as the information about the topology in a memory. A transient loop prevention method of a network node of a network having a plurality of a network nodes controlled by a link-state protocol includes the steps of receiving a message at a network interface which contains information on a change in topology of the network. There is the step of blocking forwarding of traffic to each neighbor node of the network at the network interface by a processing unit. There is the step of agreeing by the processing unit on the change in topology with the neighbor node. There is the step of unblocking the forwarding of traffic when the neighbor node has information about the topology which is the same as the information about the topology stored in a memory.

5 Claims, 9 Drawing Sheets

(56) References Cited

U.S. PATENT DOCUMENTS

| | | | | |
|---|---|---|---|---|
| 2005/0265260 | A1* | 12/2005 | Zinin et al. | 370/255 |
| 2006/0092862 | A1* | 5/2006 | Benedetto et al. | 370/256 |
| 2007/0127396 | A1* | 6/2007 | Jain et al. | 370/254 |
| 2008/0186907 | A1* | 8/2008 | Yagyuu et al. | 370/328 |

OTHER PUBLICATIONS

Yago et al., "Loop prevention for IEEE 1394 network", Jun. 13-Jun. 15, 2000, Consumer Electronics, 2000. ICCE. 2000 Digest of Technical Papers. International Conference on, p. 206-207.*

Ohba, "Issues on loop prevention in MPLS networks", Dec. 1999, Communications Magazine, IEEE (vol. 37, Issue: 12), p. 64-68.*

Janos Farkas: "802.1aq: link-state 1-11 ,protocol and loop prevention" 13-26 IEEE802, [Online] Nov. 13, 2007, XP002543889 Retrieved from the Internet: URL:http://www.ieee802.org/1/files/public/ docs2007/aq-farkas-loop-prevention-1107.pdf.

Don Fedyk: 802.1aq Shortest Path Bridging Update~ IEEE802, [Online] Jan. 31, 2008, XP002543890 Retrieved from the Internet: URL:http://www.ieee802.org/1/files/public/ docs2008/aq-fedyk-SPB-update-0108-v1.pdf.

Pallos et al., "Performance of rapid spanning tree protocol in access and metro networks", e-Techbook, Conference Proceedings, AccessNets 2007, [online], Jan. 2008, The Institute for Computer Sciences, Social-Informatics and Telecommunications Engineering, Internet <URL: http://ieeexplore.ieee.org/xpls/abs_all.jsp?arnumber=4447112>.

* cited by examiner

☐ Has outdated view on the topology

■ Informed about topology change(s)

METHOD AND APPARATUS FOR LINK-STATE HANDSHAKE FOR LOOP PREVENTION

PRIORITY CLAIM

This application claims the benefit of U.S. Provisional Application No. 61/035,850, filed Mar. 12, 2008, the disclosure of which is fully incorporated herein by reference.

TECHNICAL FIELD

The present invention is related to the prevention of a transient loop in a packet switched telecommunication network

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Today there is an increased need for faster network convergence of packet switched networks, such as IP and Ethernet networks due to the increased amount of real time traffic that they carry. In order to provide fast failure handling in IP networks different IP Fast Re-Route (IPFRR) techniques have been introduced. Although, the user traffic is redirected to a backup path very fast, the link-state control protocols applied in IP networks do not converge that fast. Therefore, so called micro-loops may appear during a topology transient, which have to be avoided.

Link-state control protocols are recently proposed to be applied in Ethernet networks too; the architecture is being specified in IEEE 802.1aq Shortest Path Bridging (IEEE 802.1aq Virtual Bridged Local Area Networks—Amendment 9: Shortest Path Bridging, Draft D0.4, Feb. 19, 2008). Loop prevention is essential for Ethernet networks as an accidental loop may cause network meltdown due to the multiplication of looped multicast or broadcast frames. As opposed to IP there is no TTL field in the header of Ethernet frames thus the frames multiplied because of a loop cannot die out from the network.

The application of link-state control protocols in Ethernet networks and in IPFRR networks raise the need of an efficient loop prevention mechanism.

Ingress checking, also referred to as Reverse Path Forwarding Check (RPFC), has been proposed to handle loops in SPB. However, ingress checking does not eliminate all possible loops but only decreases the possibility of temporal loops. That is, accidental loops may appear despite of ingress checking is applied as shown by a couple of examples.

There are various proposals for loop prevention in IPFRR However, each of these methods has significant disadvantages. They are either slow or apply tunneling or require an out-of-control plane protocol (e.g. NTP) etc. Therefore, no straightforward solution has been proposed.

SUMMARY

The present invention is related to the prevention of a transient loop in a network controlled by a link-state protocol based on blocking forwarding of traffic by a network node when the node receives a message which contains information on a change in topology of the network. This blocking of forwarding of traffic is established towards each neighbor independently of each other, and the blocking is maintained on a link between two neighbor nodes until they agree that they have the very same view on the physical topology of the network, i.e. until they agree that both of them received the very same information on the physical topology of the network, e.g. both received the information on all changes in the physical topology. After having the agreement between the neighbor nodes, the forwarding of traffic is unblocked on the link between the neighbor nodes.

Thus, the appearance of all possible loops that could appear during a transient in the network is prevented. Furthermore, the agreements, i.e. the topology view synchronization, between neighbor nodes are independent of each other, thus minimizing the blocking time on a link and making the loop free convergence fast.

BRIEF DESCRIPTION OF THE DRAWINGS

In the accompanying drawings, the preferred embodiment of the invention and preferred methods of practicing the invention are illustrated in which.

DETAILED DESCRIPTION

Figure 12:
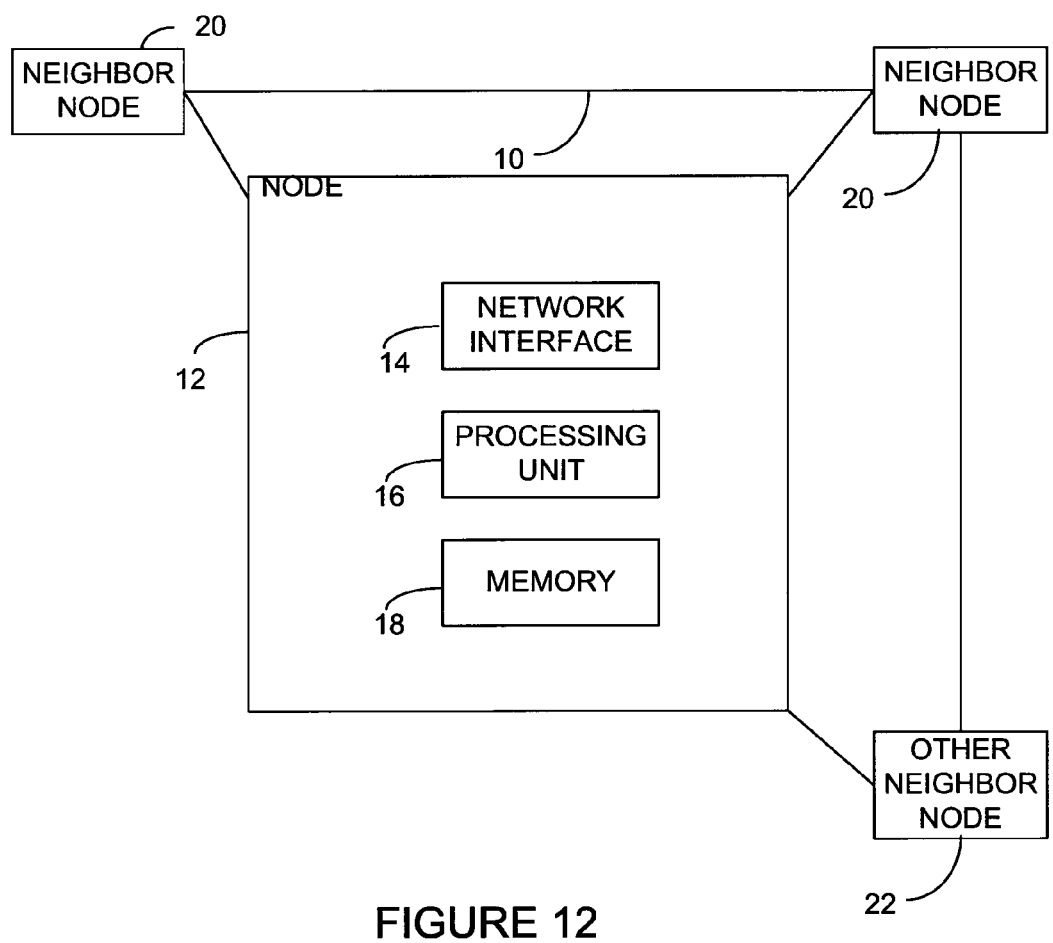
FIG. 12 is a block diagram of a node of the present invention.

Referring now to the drawings wherein like reference numerals refer to similar or identical parts throughout the several views, and more specifically to FIG. 12 thereof, there is shown a network node 12 of a telecommunications network 10 controlled by a link-state protocol. The node 12, which is depicted in detail in FIG. 12, comprises a network interface 14 which receives a message that contains information on a change in topology of the network 10. The node 12 comprises a processing unit 16 that blocks forwarding of traffic to at least one neighbor node 20 of the network 10 at the network interface 14, agrees on the change in topology with the neighbor node 20; and unblocks the forwarding of traffic when the neighbor node 20 has information about the physical topology which is the same as the information about the physical topology in a memory 18. The physical topology comprises all network nodes and all connections between them. A link-state control protocol is used in the network and an instance of the control protocol entity is run in each network node. The link-state protocol maintains the information about the physical topology in each network node. The link-state control protocol determines forwarding paths for data messages between network nodes. The forwarding paths used in an Ethernet network comprise the so-called active topology, which should be always loop free. In traditional Ethernet networks the active topology is typically a spanning tree controlled by the Rapid Spanning Tree Protocol (RSTP). The spanning tree does not comprise all physical connections but inactivate some of the redundant ones in order to avoid loops. The connections kept active by RSTP form the active topology, which is a spanning tree. MSTP and SPB are able to handle multiple active topologies, i.e. multiple trees.

The network interface 14 can receive an advertisement from another neighbor node 22 which contains the information on the change to the topology. The processing unit 16 can block at least an active topology or a forwarding path that is affected by the change at least at one port of the network interface 14. The network interface 14 can send a synchronization request to the neighbor node 20 on at least one port which contains the information on the advertisement. The processing unit 16 can verify the neighbor node 20 has received the advertisement. The network interface 14 can receive a synchronization acknowledgment from the neighbor node 20 to which the synchronization request has been sent that indicates the neighbor node 20 has updated the topology according to the topology information in the advertisement. The purpose of the synchronization is to assure that the neighbor nodes have the very same view on the physical topology of the network. As described above it can be done by checking that both neighbor nodes received all pieces of information on the physical topology, i.e. have the very same set of advertisements. An alternative to this is to verify that they have the very same topology database describing the physical topology of the network. For this purpose the neighbor nodes may exchange a digest of their topology database (the part of the database that describes the physical topology or e.g. the entire topology database that stores all the received advertisements) and synchronize themselves based on this digest. The digest can be for instance a unique hash or a CRC prepared based on the topology database The network interface 14 can receive the synchronization acknowledgment having a node ID and a sequence number of the advertisement. The network interface 14 can receive a synchronization request. The processing unit 16 can verify the advertisement has been received and processed for which the synchronization request has been sent. The network interface 14 can send a synchronization acknowledgment. The network interface 14 can have the IS-IS Send Routing Message Flag set for each link-state PDU per port and a flag regarding blocking of a port when the advertisement has the topology change information. There can be a BPDU in RSTP/MSTP that has a flag for a synchronization request message and a flag for a synchronization acknowledgment message besides having a digest of the topology database or having a node ID and a sequence number of the advertisement.

Figure 1:
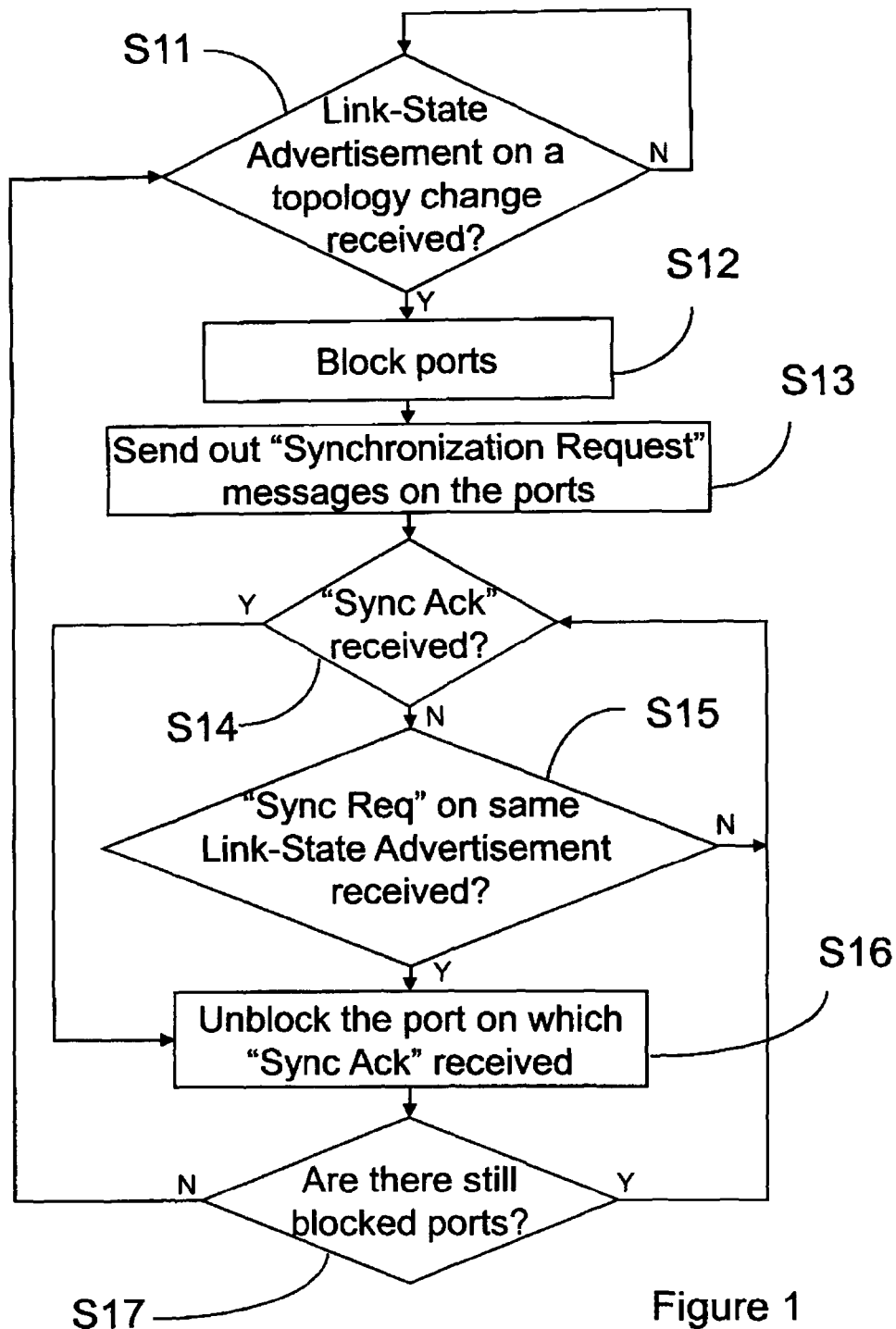
FIG. 1 is a flow chart of the present invention when a message is received having information on a topology change.
Figure 2:
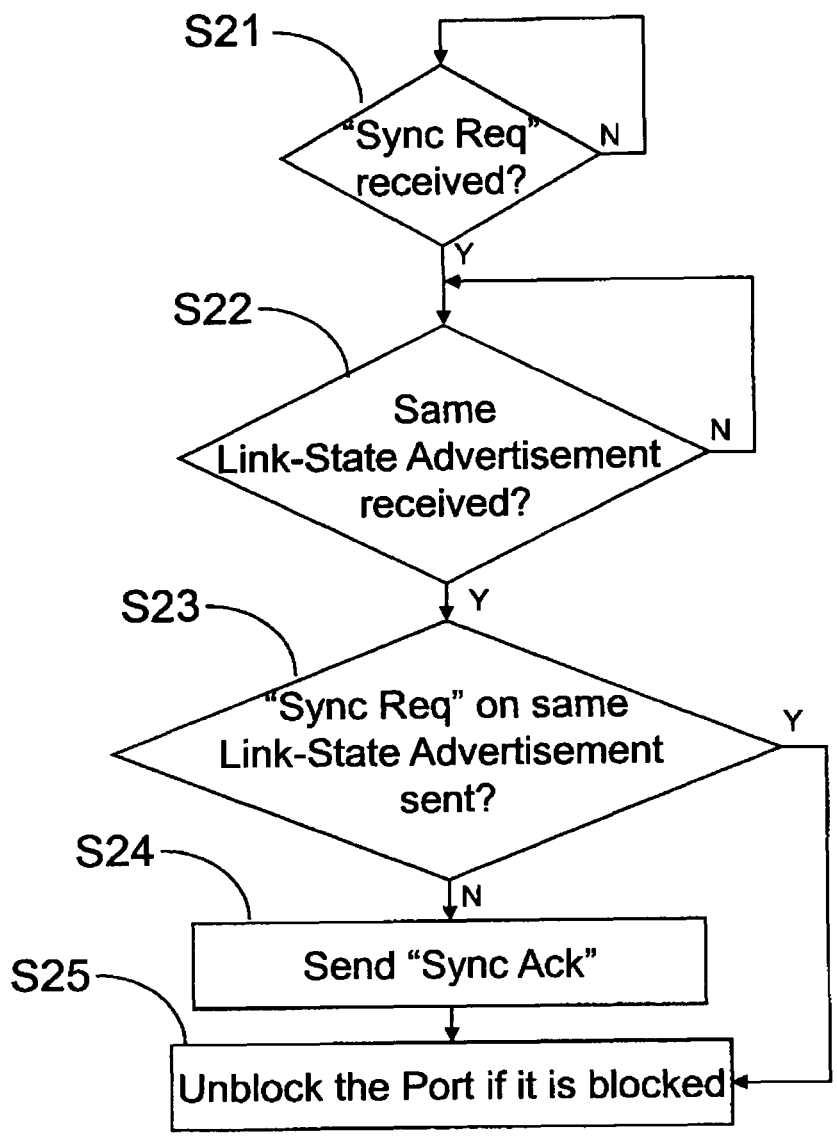
FIG. 2 is a flow chart of the present invention when a Synchronization Request message is received from a neighbor node.

The present invention pertains to a transient loop prevention method of a network node 12 of a network 10 having a plurality of a network nodes 12 controlled by a link-state protocol, which is illustrated in FIG. 1 and in FIG. 2. The method comprises the step S11 of receiving a message at a network interface 14 which contains information on a change in topology of the network 10. There is the step S12 of blocking forwarding of traffic to each neighbor node 20 of the network 10 at the network interface 14 by a processing unit 16. There is the step of agreeing by the processing unit 16 on the change in topology with the neighbor node 20. There is the step S16 of unblocking the forwarding of traffic when the neighbor node 20 has information about the topology which is the same as the information about the topology stored in a memory 18, i.e. the neighbor node 20 has the same view on the topology. There is the step S17 of checking whether there are still blocked interfaces 20.

The step S11 of receiving a message can include the step of receiving an advertisement at the network interface 14 from another neighbor node 22 which contains the information on the change to the topology. The blocking step S12 can include the step of blocking at least an active topology or a forwarding path that is affected by the change at network interface 14. There can be the step of maintaining the blocking until the neighbor node 20 agrees that it has a topology in its memory 18 that is the same as the topology in the memory 18.

The agreeing step can include the step S13 of sending a synchronization request to the other neighbor node 22 on at least one port which contains the information on the advertisement or on the topology database. The agreeing step can include the step of verifying the neighbor node 20 has received the same advertisement(s), i.e. has the very same topology database. The verifying step can include the step S14 of receiving a synchronization acknowledgment from the neighbor node 20 to which the synchronization request has been sent that indicates the neighbor node 20 has updated the topology according to the topology information in the advertisement. The reception of the synchronization acknowledgment step S14 can include the step of receiving the synchronization acknowledgment having a node ID and a sequence number of the advertisement or receiving the synchronization acknowledgment having a digest on the topology database. The verifying step can include the step S15 of receiving a synchronization request on the very same piece of information sent to the neighbor node 20. That is the synchronization request received may have the same node ID and sequence number or digest as the synchronization request sent to the neighbor node 20 before.

There is the step S21 of the network interface 14 receiving a synchronization request, as more specifically of FIG. 2. There is the step S22 of verifying with the processing unit 16 the advertisement has been received and processed or having the same digest on the topology database for which the synchronization request has been sent. There can be the step S23 checking whether a synchronization request on the very same piece of information has been sent to the neighbor node 20. There is the step S24 of sending with the network interface 14 a synchronization acknowledgment. There is the step S25 of unblocking the port if it is blocked.

There can be the step of configuring the IS-IS Send Routing Message Flag on each network interface 14 for each IS-IS link-state PDU. There can be the step S12 of setting a flag regarding blocking of a port at the reception of an advertisement containing topology change information. Alternatively, there can be a BPDU in RSTP/MSTP has a flag for a synchronization request message and a flag for a synchronization acknowledgment message and the description of the information on which the synchronization is requested for, which for instance can be a digest of the topology database or a node ID and a sequence number. There can be the step of agreeing with the neighbor node 20 on a digest of at least a portion of the topology stored in the memory 18. There can be the step of the agreeing step includes the step of using a CRC or a hash.

There are no loops in the active topologies of Ethernet networks or in the forwarding trees of IP networks when the physical topology is stable, i.e. there is no change in the physical topology. That is, loops may only appear during the reconfiguration of forwarding topologies due to a change in the network 10, e.g. breakdown event or reconfiguration, but there is no loop either before the control plane update or after the update. Therefore, loop prevention has to operate during topology transients.

Furthermore, the main reason of accidental loops in case of a link-state control protocol is that network nodes 12 become aware of the change(s) in an asynchronous manner, i.e. at different time and the order of their notification is unpredictable. That is, the main reason for accidental loops is that the nodes 12 have an inconsistent view on the network 10 topology.

In the operation of the invention there are no temporal or transient loops despite of changes in the physical topology. The present invention temporarily blocks forwarding at a network node 12 if the node 12 becomes aware of a change in the topology. Then the node 12 starts a handshake negotiation technique with its neighbors one by one, independently of each other. A link becomes unblocked again if both neighbors have the same information on the physical topology of the network 10. Neighbors either agree on the latest topology changes or on a digest of the physical topology in a handshake technique. Therefore, it cannot happen that a link is in use between neighbors having different views on the topology. By blocking links between such neighbors all possible loops are cut before they could appear.

All stable forwarding topologies, i.e. active topologies of Ethernet networks or forwarding trees formulated by routing entries in IP networks are loop free. That is there are no loops either in the forwarding topology set-up by the control protocol before the change or in the forwarding topology after the change. Loops can be eliminated from the network 10 by proper cuts applied during topology transients. The handshake based loop cutting mechanism proposed in this invention for link-state control protocols is described in the following in detail.

Link-state protocols apply periodic Hello messages to discover the neighbors of a node 12 and to monitor the connectivity. Each node 12 advertises its information on its neighbors by flooding a Link State Advertisement (LSA) message in case of OSPF or a Link State Protocol Data Unit (LSP) in case of IS-IS. These advertisements are identified by the ID of the sender node 12 and a sequence number. Therefore, it can be easily verified whether a node 12 has received the latest advertisement from a given node 12 or not. Network nodes 12 build up and maintain a database on the physical topology of the network 10 and calculate forwarding paths based on this topology database. Thus, if all nodes 12 have the same view on the topology then they calculate the very same forwarding paths thus no loop may appear. It can be also verified whether the topology database of two nodes are identical by exchanging a digest on the database, e.g. a CRC or a hash.

FIG. 1 shows the operation of the proposed loop prevention method when a Link-State Advertisement is received by a node 12. If it is just a refreshment of old information then there is nothing to do for the loop prevention mechanism. As opposed to this, if the advertisement contains information on a change in the topology then the receiver node 12 has to block all of its ports. Thus cuts appear in the forwarding topology, this way preventing the network 10 from occurrence of any accidental loop. Blocking of ports may mean blocking of the entire port or only blocking of the active topology that is affected by the change. For instance, in case of SPB there are multiple Shortest Path Trees (SPT) configured and it is enough to block the tree to which the advertisement belongs.

After blocking the ports, a Synchronization Request (Sync Req) is sent to the neighbor nodes 20 on each port, which either contains the information on the latest advertisement(s) received, i.e. the Node ID and the Sequence Number or contains a digest of the topology database. The request maybe on a bunch of advertisements, i.e. Sync Req message may contain multiple Node IDs and corresponding Sequence Numbers.

A port is blocked until a Synchronization Acknowledgement (Syn Ack) is received from the neighbor node 20 on the same LSA (LSP) or same digest for which the synchronization has been requested. The Syn Ack also contains the Node ID and the Sequence number of the advertisement that is acknowledged or contains the digest. The acknowledgement is sent out if the node 12 that has received the request had also received the advertisement in question and updated the forwarding topologies according to the new physical topology, i.e. has the same topology database.

There is a cut at the requesting node 12 towards a neighbor node 20 until that specific neighbor has acknowledged the topology change.

FIG. 2 shows the operation of the link-state loop prevention handshake mechanism when a Synchronization Request is received by a node 12. First, it has to be verified whether the very same advertisement(s) had been received and processed for which the synchronization request has been sent. Note that multiple advertisements may be bunched during the synchronization process depending on the implementation of the link-state handshake method.

If the same advertisement(s) is received and processed then the Synchronization Acknowledge message is sent to the neighbor, which contains the ID(s) of the advertisement(s), and the port is unblocked if it was blocked before or contains the digest.

Note that two neighbor nodes 20 may receive the very same advertisement at the same time (or practically the same time). Then both of them initiate the handshake mechanism by sending the synchronization request. There are two options to handle this situation:

a) both nodes block the link, send the request, send and receive the acknowledgement from the other side and unblock the link, b) consider the Synchronization Request received from the neighbor on the very same advertisement as an acknowledgement as both neighbors have the same topology information.

Option b is faster and the operation according to option b is shown in FIG. 2.

DEMONSTRATIVE EXAMPLE OF THE OPERATION

Figure 3:
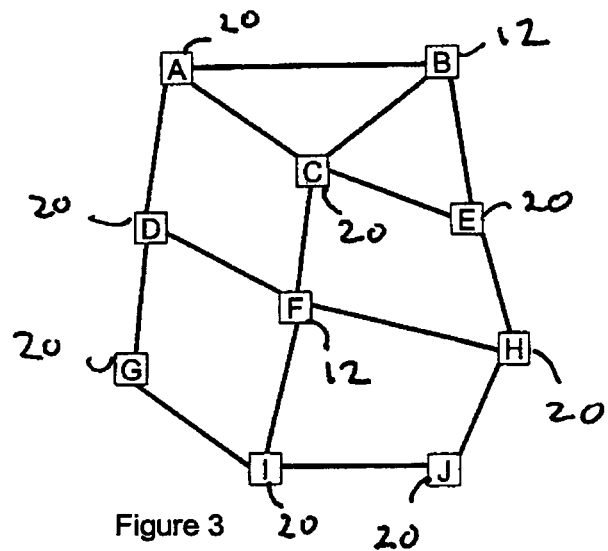
FIG. 3 is an example of a network topology.

The operation of the link-state handshake protocol is demonstrated in the following in an example network 10 depicted in FIG. 3. Not that only the physical topology is presented there can be various forwarding topologies above this physical topology.

Let us assume that a change in the topology happened. It can be any kind of change; it does not matter for the method so the change itself is not shown in the figure. The nodes 12 are notified about the change in an unspecified, practically random order. The order according to which the nodes 12 become aware of the change does not matter for the operation of the proposed method. One order is selected and demonstrated in the following.

Figure 4:
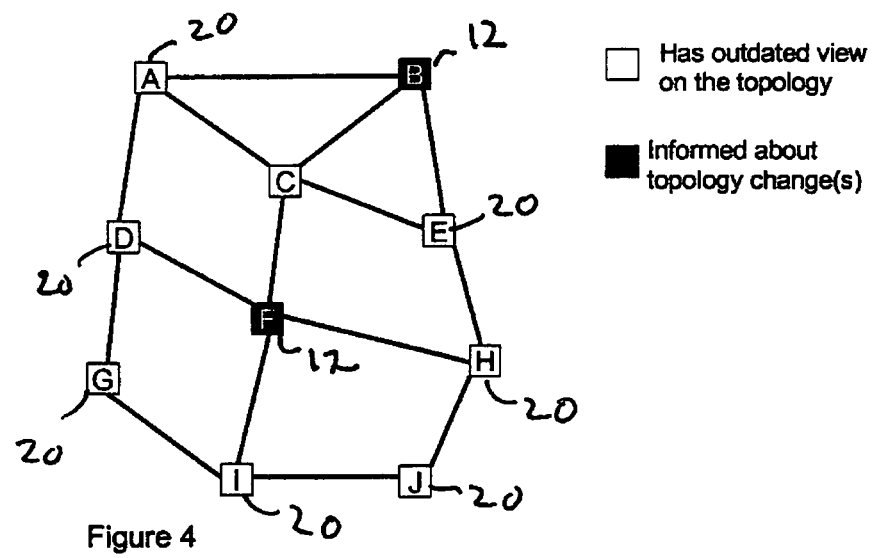
FIG. 4 shows nodes notified first of the network topology for FIG. 3.

It is assumed that nodes B and F become aware of the change as illustrated in FIG. 4.

Figure 5:
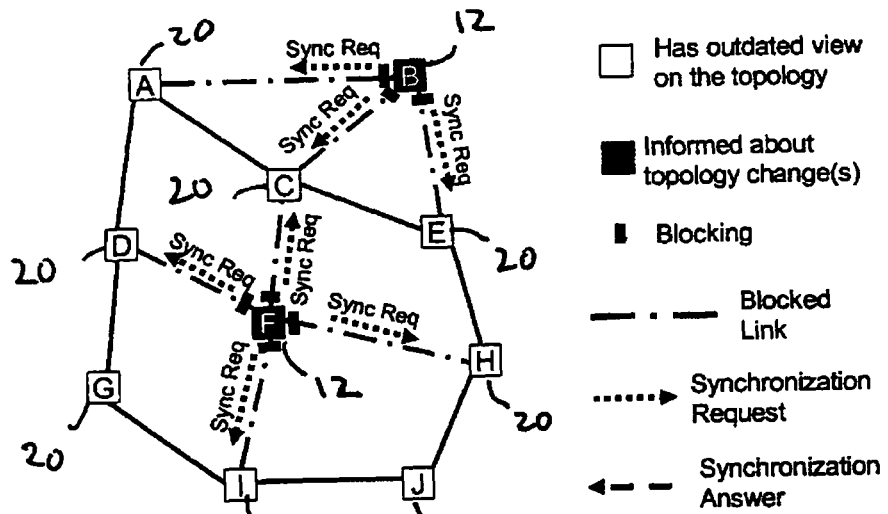
FIG. 5 shows which nodes block their path of the example operation of link-state handshake protocol.

As FIG. 5 shows nodes B and F block their ports as they realize the topology change and send out the Synchronization Request on the advertisement received.

Figure 6:
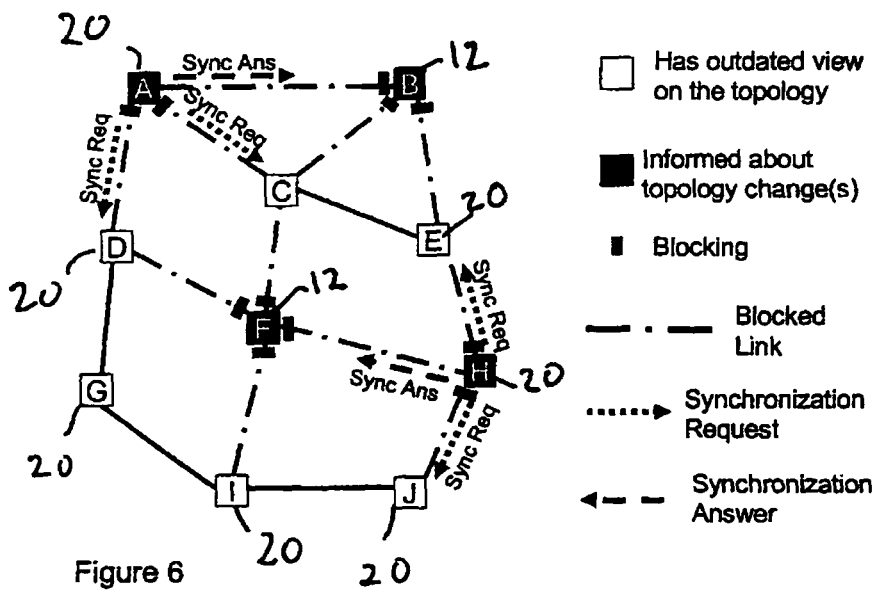
FIG. 6 shows additional nodes recognize the change of the example.

After that, nodes A and H are also notified on the change as shown in FIG. 6. They send back the Synchronization Acknowledge to the neighbors on the port they received the Synchronization Request. They block all the rest of their ports and send out the Synchronization Request.

Figure 7:
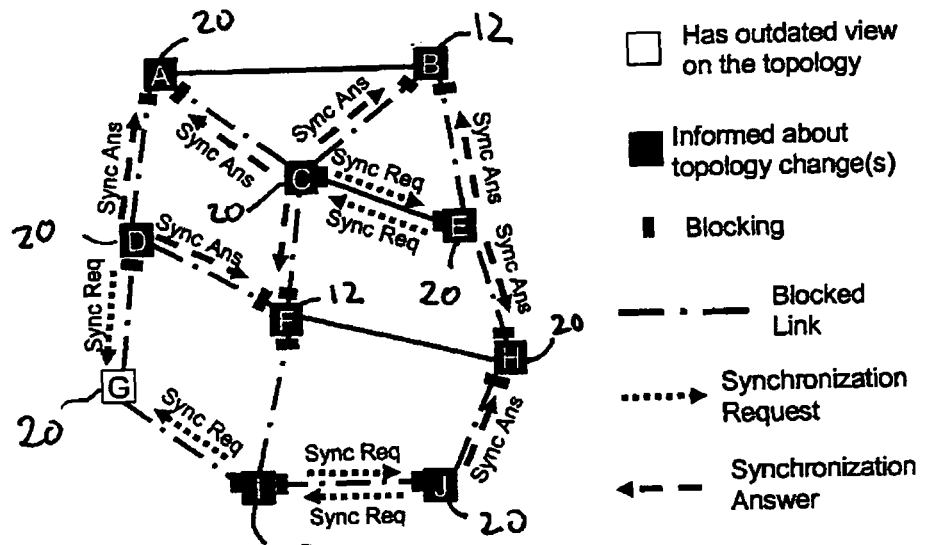
FIG. 7 shows even more nodes recognize the change of the example.

As soon as the acknowledgements arrive, A-B and F-H links become unblocked as depicted in FIG. 7. Nodes C, D, E, I and J become aware of the change in the next step so they acknowledge former requests, block the rest of their ports and send out the Synchronization Request. Note that nodes I and J send the request at the same time, which holds for nodes C and E too.

Figure 8:
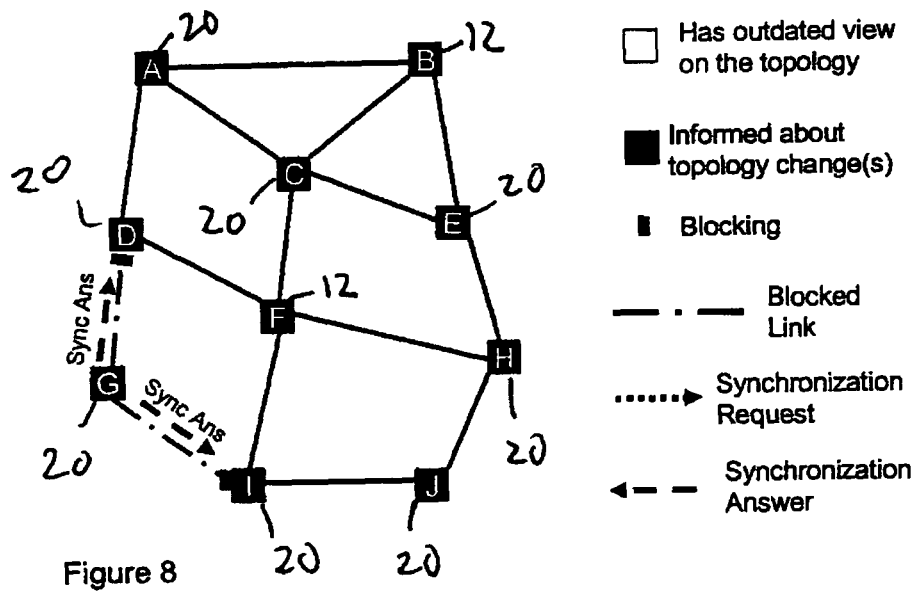
FIG. 8 shows all nodes recognize the change of the example.

The algorithms shown in FIG. 1 and FIG. 2 are applied, i.e. if both neighbors send the request for the same advertisement on the same link then they activate the link after the reception of the request from the other side. FIG. 8 shows the result of the previous messages.

Figure 9:
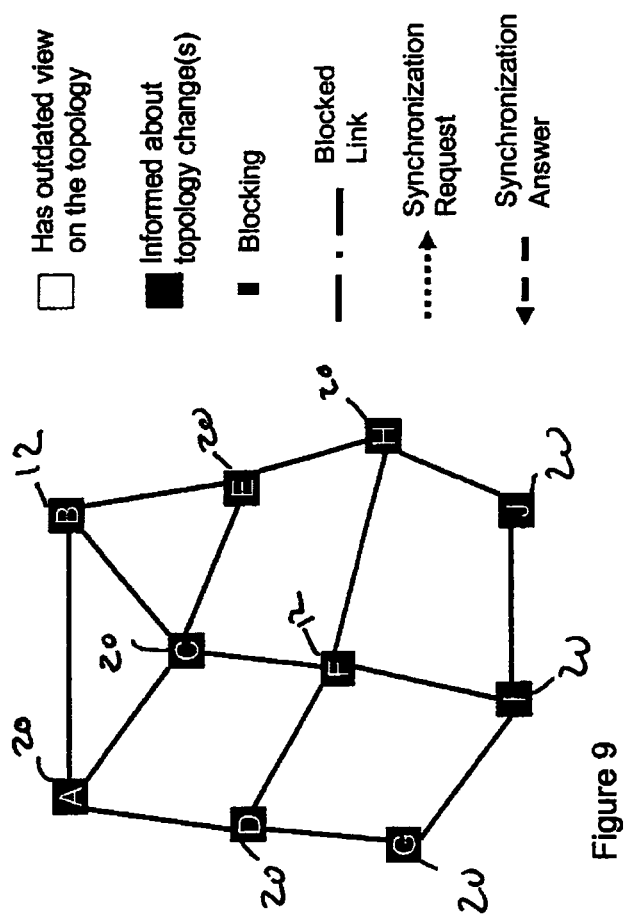
FIG. 9 shows all nodes are updated of the example.

FIG. 9 shows the case where all nodes 12 are updated and the last one has sent back the acknowledgement thus there is no blocked link.

As the above figures show there are independent cuts in the forwarding topology during convergence, which are not synchronized to each other but depend on the order of notification of network nodes 12. It is very important that the network 10 is not shut down during convergence. The handshake technique differs from the one implemented in RSTP/MSTP because in RSTP/MSTP the handshake is coupled to the information propagation on topology change, which is carried by the distance vector, thus proposal-agreement handshakes has to follow a sequence from the Root Bridge towards leaf bridges.

Figure 10:
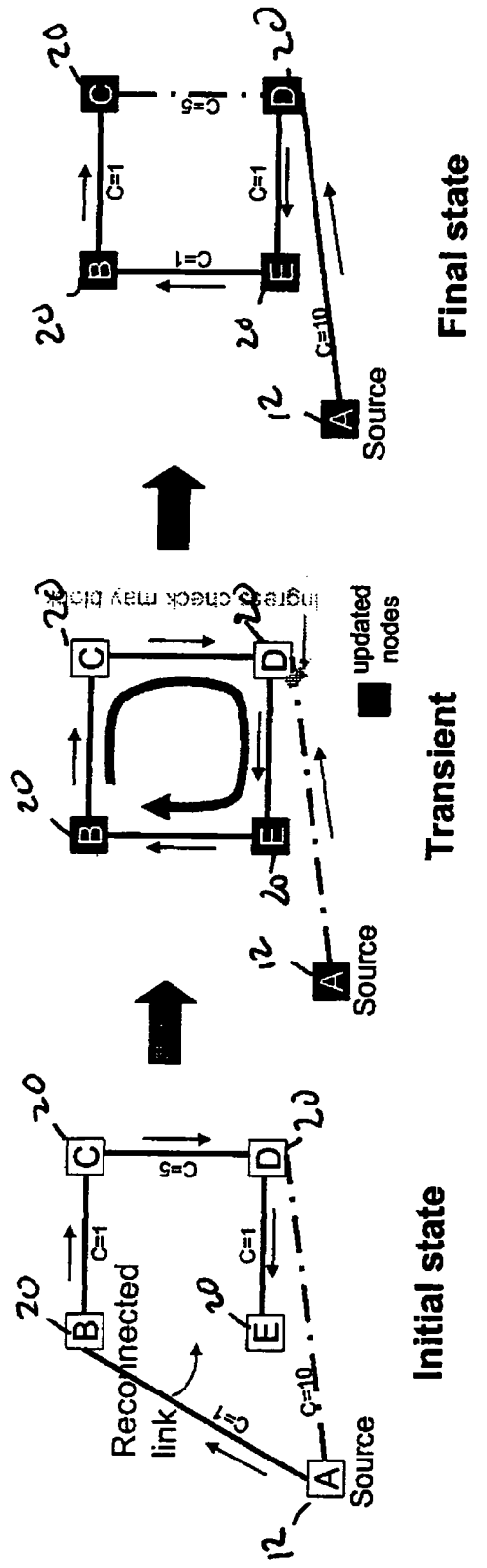
FIG. 10 shows a transient loop in IS-IS based SPB, which appears even if ingress checking is applied.

There have been a couple of scenarios identified where transient loops may appear in the IS-IS based architecture that has been proposed for SPB despite of appling a loop mitigation, e.g. ingress checking. One of them is depicted in FIG. 10.

The physical connection between A and B is cut and a new physical connection appears between B and E at the same time. The link costs are also indicated in the figure; the arrows show the packet transmission from node A. As it can be seen the Initial and the Final topology are loop-free. The link between A and D is not used in the initial topology; and the link between C and D is unused in the final one. However, a loop is formed during the transient if nodes A, B and E have updated view on the topology but nodes C and D have outdated view. The loop appears even if ingress checking is applied.

Figure 11:
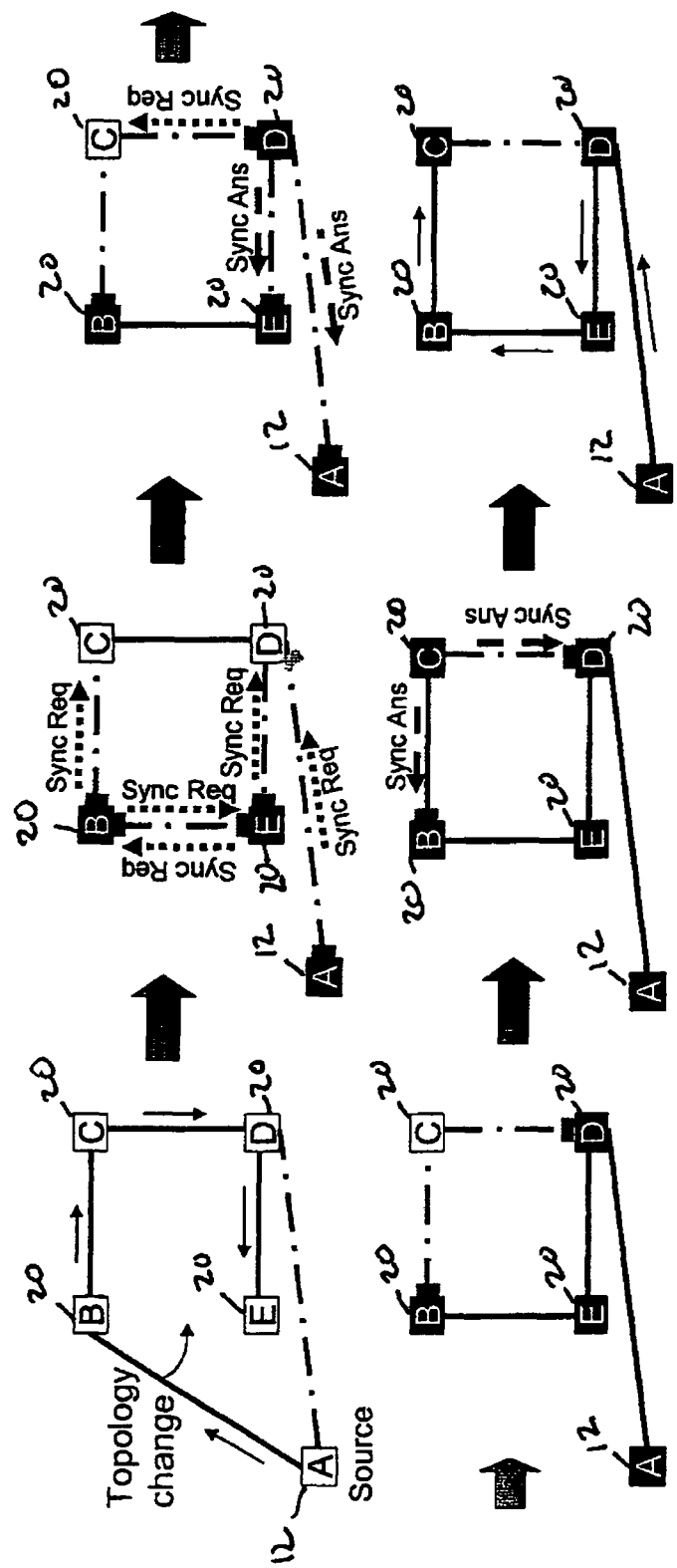
FIG. 11 shows loop prevention for an SPB scenario of the present invention.

Applying the Link-State Handshake technique prevents the network 10 from the accidental loop as depicted in FIG. 11.

The loop cannot appear because the link between neighbors having different topology views is always cut.

The Link-State Handshake technique can be implemented in various ways. Two example implementation possibilities are described here.

The Link-State Handshake mechanism can be implemented with the help of IS-IS PDUs and by the introduction of a new flag per each port of the node 12. Let us call this flag as BLOCKflag. The application of existing IS-IS PDUs is described here. An alternative to this is to define new PDUs or TLVs for the handshake mechanism.

In IS-IS, the transmission of LSPs is controlled by the Send Routing Message flag (SRMflag), which can be set for each Link State PDU (LSP) per port (circuit). If the SRMflag for an LSP on a port is set then an LSP is going to be transmitted at the expiration of Minimum LSP Transmission Interval or immediately if a new LSP has been received. That is LSPs are sent out either because the Update Process automatically re-generates them or because a new LSP containing new information on network topology has arrived. Both kind of LSP transmissions are controlled by the SRMflag. On point-to-point links, the SRMflag is cleared if either a Partial Sequence Number PDU (PSNP or a Complete Sequence Number PDU (CSNP) is received for that LSP on that port. That is PSNP serves as a kind of acknowledgement for the LSPs listed in the PSNP had been received by the adjacent neighbor. If the LSP is not listed in the PSNP message then the SRMflag remains set, therefore, the LSP is going to be retransmitted to that neighbor. That is PSNP is for the control of retransmission of LSPs in IS-IS over point-to-point links.

The Link-State Handshake mechanism can be implemented with some extensions to IS-IS. A new flag is introduced for each port: BLOCKflag; if the BLOCKflag is set then user plane frames are not allowed to pass through via that port, otherwise user frames can be transmitted via that port. The port blocking has to be implemented somehow, i.e. no frames can enter the node 12 via that port and no frames can be sent out via that port. This can be implemented for instance by setting up a filter that is controlled by the BLOCKflag. Note that if IS-IS is used over a bridge network 10 then port blocking can be implemented by using the Blocking Port Role of RSTP/MSTP. LSPs are used as Synchronization Request messages and PSNPs are used as Synchronization Acknowledge message of the Link-State Handshake method. In addition to this, the transmission of PSNPs has to be accelerated, which are sent out according to the PSNP interval. In the current applications of IS-IS, the PSNP interval is in the range of seconds, which is not applicable for a loop prevention method as it would result in very slow convergence. Therefore, the PSNP interval has to be decreased into the range of milliseconds or tens of milliseconds. The transmission of PSNPs is controlled by the Send Sequence Numbers Message flags (SSNflag), which is set at the reception of each LSP transmitted on a point-to-point link. If the SSNflag is set for an LSP on a port then the corresponding LSP has to be listed in the next PSNP sent out on that port. SSNflag is cleared when the corresponding PSNP has been sent out. In order to be able accelerate the transmission PSNPs the SSN-flags of the LSPs have to be able to be checked very easily and fast. Therefore, it is proposed to maintain a separate vector (SSNvector) for the SSNflag, thus it can be easily checked by a binary operation whether is there any SSNflag set and the corresponding LSP is to be listed in the next PSNP. Another possibility is to implement an interrupt based control for the transmission of PSNPs instead of the polling kind PSNP interval based transmission. As the PSNP is received the SRNflag is cleared. In that case both neighbors are aware of the topology change carried by the corresponding LSP thus the link between them can be unblocked. That is the BLOCK-flag has to be cleared and the link is reactivated.

The operation of IS-IS with these settings and extensions is as follows in a network 10 where only point-to-point links are installed. Let us assume that a node 12 receives an LSP about a topology change in one of its ports. The SRMflag is then set for that LSP for all ports except for the one on which the LSP has been received. If the LSP is not a repetition of a former one but it is about a topology change then the BLOCKflag has to be also set for all ports except for the one on which the LSP arrived. That is all of these ports have to be blocked. Note that the port on which the LSP arrived is not needed to be blocked since the neighbor connected to that particular node 12 is aware of the topology change as that node 12 sent the information on it. If the SRMflag is set on a port then the IS-IS entity forwards the LSP via that port. The SRMflag is kept set until a PSNP is not received on that port. As the neighbor receives the LSP on a point-to-point link it sets the corresponding SSNflag. If the SSNflag is set for an LSP then the reception of that LSP is going to be reported to the neighbor in the next PSNP, which is sent periodically according to the PSNP interval. All the LSPs received within the PSNP interval are acknowledged in the same PSNP. As the PSNP has been received both the SRMflag and the BLOCKflag are cleared and the link is unblocked, user frames can be transmitted on it.

RSTP/MSTP provides the Proposal-Agreement handshake mechanism for loop prevention. This mechanism is coupled to the distance vector from the Root Bridge, which indicates topology change information if it has been changed. Since RSTP and MSTP are distance vector control protocols their combined application together with a link-state control protocol such as IS-IS is not beneficial. If IS-IS is the control protocol for configuring the active topology in SPB then RSTP/MSTP should not run in parallel.

Although, IS-IS can be used in a bridge network 10 for the configuration of the active topologies and the Link-State Handshake mechanism can be implemented in RSTP/MSTP BPDUs and run parallel to IS-IS.

RSTP/MSTP BPDUs implement a handshake mechanism thus the Link-State Handshake mechanism can be implemented in such BPDUs with a little modification on them.

The Proposal flag (Bit 2 of Octet 5) of BPDUs can be used as a flag for Synchronization Request message.

The Agreement flag (Bit 7 of Octet 5) of BPDUs can be used as a flag for Synchronization Acknowledge message.

IS-IS is aimed to be used in SPB as a link-state control protocol for SPB. The LSP ID and the Sequence Number of an IS-IS LSP can be used as an identifier of topology change information. The LSP ID is the System ID of the source of the Link State PDU; the Sequence Number is the sequence number of LSP. Therefore, the LSP ID and the Sequence Number should be incorporated into BPDUs in order to implement Synchronization Request and Synchronization Acknowledge messages of the proposed Link-State Handshake mechanism. It is an option to define room form the identification of more LSPs in the same BPDU. An alternative to this is to extend the BPDUs with a digest of the topology database and provide the handshake based on the digest.

Port blocking can be for instance implemented by using the Blocking Port role.

That is, the loop prevention technique can be easily implemented based on RSTP/MSTP BPDUs.

This invention provides a new method for loop prevention in link-state control protocol controlled networks 10. Link-state protocols update their view on the network 10 topology in an asynchronous manner, i.e. in an unpredictable order; therefore, transient loops may appear during network 10 convergence after a change in the topology, which may degrade the performance of the network 10. The proposed Link-State Handshake method prevents the appearance of loops in the network 10 by introducing temporal cuts in between neighbor nodes 20. These cuts do not depend on each other thus do not influence the convergence time significantly with appropriate implementation and configuration. Two implementation possibilities have been also proposed.

This invention is related to the ongoing discussions in IEEE 802.1aq Shortest Path Bridging. The proposed method maybe applied in the IP Fast Re-Route framework too.

ABBREVIATIONS

BPDU Bridge Protocol Data Unit
CSNP Complete Sequence Number PDU
IP-FRR IP Fast Re-Route
IS-IS Intermediate System to Intermediate System Routing Protocol
LSA Link State Advertisement
LSP Link State Protocol Data Unit
MSTP Multiple Spanning Tree Protocol
OSPF Open Shortest Path First
PSNP Partial Sequence Number PDU
RSTP Rapid Spanning Tree Protocol
SPB Shortest Path Bridging
SRMflag Send Routing Message flag
SSNflag Send Sequence Numbers Message flags Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A transient loop prevention method in a network having a plurality of network nodes linked to each other through interfaces and controlled by a link-state protocol, each node comprises a processor unit, the method comprising the steps of:
   receiving a synchronization request at a network interface;
   receiving a message at the network interface having a port, the message contains an advertisement at the network interface from another neighbor node which contains information on a change in the topology;
   blocking forwarding of traffic to each neighbor node of the network at the network interface by the processing unit and to at least an active topology or a forwarding path that is affected by the change at network interface to prevent a transient loop;
   agreeing by the processing unit on the change in topology with each neighbor node so there will be no transient loop by exchanging a description on a topology database or a digest of the topology database and sending a synchronization request to the other neighbor node on at least one port which contains the information on the advertisement and verifying the neighbor node has the same topology database by receiving a synchronization acknowledgment having a node ID and a sequence number of the advertisement from the neighbor node to which the synchronization request has been sent that indicates the neighbor node has updated the topology according to the topology information in the advertisement;
   setting a Send Routing Message Flag for each IS-IS link-state protocol data unit (PDU) per port'
   setting a flag regarding blocking of a port when the advertisement contains topology change information, clearing the flag regarding blocking of a port at the reception of a Partial Sequence Numbers Protocol Data Unit (PSNP);
   configuring the PSNP Interval in the range of 1-10 milliseconds for fast convergence
   maintaining the blocking until the neighbor node agrees that it has a topology in its memory that is the same as the topology in a memory in the network node;
   verifying with the processing unit the advertisement has been received and processed for which the synchronization request has been sent;

unblocking the forwarding of traffic when the neighbor node has information about the topology which is the same as the information about the topology stored in the topology database in the memory in the network node so there is no transient loop; and sending with the network interface a synchronization acknowledgment.

2. The method as described in claim 1 wherein a Bridge Protocol Data Unit (BPDU) in Rapid Spanning Tree Protocol (RSTP)/Multiple Spanning Tree Protocol (MSTP) has a flag for a synchronization request message and a flag for a synchronization acknowledgment message and the BPDU contains either the description on the topology database or the digest of the topology database.

3. The method as described in claim 1 wherein the agreeing step includes the step of agreeing with the neighbor node on a digest of at least a portion of the topology stored in the memory, where the digest is a Cyclic Redundancy Check (CRC) or a hash of the topology database.

4. A network node of a telecommunications network having a plurality of network nodes linked to each other through interfaces and controlled by a link-state protocol comprising:

a network interface having a port which is adapted to receive a message that contains information on a change in topology of the network, the network interface is adapted to receive an advertisement from another neighbor node which contains the information on the change to the topology, the network interface is adapted to send a synchronization request to the neighbor node on at least one port which contains the information on the advertisement, the network interface is adapted to receive a synchronization acknowledgment from the neighbor node to which the synchronization request has been sent that indicates the neighbor node has updated the topology according to the topology information in the advertisement, the network interface is adapted to receive the synchronization acknowledgment having a node ID and a sequence number of the advertisement, the network interface is adapted to receive a synchronization request, the network interface is adapted to send a synchronization acknowledgment, a Send Routing Message Flag is set in each network interface for each link-state protocol data unit (PDU) per port and the network interface is adapted to maintain a flag regarding blocking of a port and to set the blocking flag when the advertisement has the topology change information and to clear the blocking flag at the reception of a corresponding Partial Sequence Numbers Protocol Data Unit;

a memory having a topology database; and a processing unit that blocks forwarding of traffic to at least one neighbor node of the network at the network interface to prevent transient loops, agrees on the change in topology with the neighbor node so there will be no transient loops by exchanging a description on the topology database or a digest of the topology database, and unblocks the forwarding of traffic when the neighbor node has information about the topology which is the same as the information about the topology in a memory so there are no transient loops, the processing unit blocks at least an active topology or a forwarding path that is affected by the change at least at one port of the network interface, the processing unit verifies the neighbor node has received the advertisement, the processing unit verifies the advertisement has been received and processed for which the synchronization request has been sent.

5. The node as described in claim 4 wherein a Bridge Protocol Data Unit (BPDU) in Rapid Spanning Tree Protocol (RSTP)/Multiple Spanning Tree Protocol (MSTP) has a flag for a synchronization request message and a flag for a synchronization acknowledgment message and the BPDU contains either a description on the topology database or a digest of the topology database.

* * * * *

UNITED STATES PATENT AND TRADEMARK OFFICE
CERTIFICATE OF CORRECTION

PATENT NO.       : 8,606,961 B2                                              Page 1 of 1
APPLICATION NO.  : 12/922235
DATED            : December 10, 2013
INVENTOR(S)      : Farkas It is certified that error appears in the above-identified patent and that said Letters Patent is hereby corrected as shown below:

In the Claims

In Column 10, Line 54, in Claim 1, delete "per port'" and insert -- per port; --, therefor.

In Column 10, Line 61, in Claim 1, delete "convergence" and insert -- convergence; --, therefor.

Signed and Sealed this
Twenty-second Day of July, 2014

Michelle K. Lee
*Deputy Director of the United States Patent and Trademark Office*